United States Patent
Gebert et al.

(10) Patent No.: US 7,755,309 B2
(45) Date of Patent: Jul. 13, 2010

(54) DRIVE SYSTEM FOR A MOTOR VEHICLE

(75) Inventors: Juergen Gebert, Moosburg (DE); Markus Kaindl, Rohrbach (DE); Hans Glonner, Pfaffenhofen (DE); Florian Oesterreicher, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 240 days.

(21) Appl. No.: 11/971,014

(22) Filed: Jan. 8, 2008

(65) Prior Publication Data

US 2008/0106227 A1    May 8, 2008

Related U.S. Application Data

(63) Continuation of application No. PCT/EP2006/006428, filed on Jul. 1, 2006.

(30) Foreign Application Priority Data

Jul. 9, 2005    (DE)  .................. 10 2005 032 196

(51) Int. Cl.
B60L 7/26   (2006.01)
(52) U.S. Cl. ..................... 318/139; 318/371
(58) Field of Classification Search ................. 318/139, 318/372, 375, 376, 370, 371
See application file for complete search history.

(56) References Cited

U.S. PATENT DOCUMENTS 5,707,115 A * 1/1998 Bodie et al. ............... 303/3
6,086,166 A * 7/2000 Fukasawa ................. 303/152
6,387,006 B1   5/2002 Jung
6,454,364 B1 * 9/2002 Niwa et al. ................. 303/152
7,167,783 B2 * 1/2007 Park et al. .................. 701/22
2002/0177504 A1 * 11/2002 Pels et al. .................. 477/3
2005/0101435 A1 * 5/2005 Cowan ...................... 477/83
2006/0166786 A1 * 7/2006 Baasch et al. ............... 477/109

FOREIGN PATENT DOCUMENTS

DE    195 28 628 A1    2/1997
DE    197 41 440 A1    4/1999
DE    103 35 775 A1    3/2005

OTHER PUBLICATIONS

German Search Report dated Sep. 8, 2005 w/English translation of pertinent portions (nine (9) pages).

* cited by examiner

*Primary Examiner*—Bentsu Ro
(74) *Attorney, Agent, or Firm*—Crowell & Moring LLP

(57) ABSTRACT

A drive system for a motor vehicle comprising an internal-combustion engine, an electric machine coupled to the internal-combustion engine, and a transmission device through which a ratio change can be implemented without a tractive power interruption is described. Also described is a control device for controlling the electric machine and for controlling the transmission device. The control device is constructed such that, in the event of a braking demand, the demanded total braking torque is at least proportionally provided by the electric machine, and, in the case of an existing braking demand with a constant total braking torque and a change of the transmission ratio implemented in the presence of this braking demand, the electric machine is controlled such that the total braking torque changing because of the ratio change is at least partially compensated, so that a constant total braking torque according to the braking demand is maintained.

19 Claims, 3 Drawing Sheets

DRIVE SYSTEM FOR A MOTOR VEHICLE

CROSS REFERENCE TO RELATED APPLICATIONS

This application is a continuation of PCT International Application No. PCT/EP2006/006428, filed Jul. 1, 2006, which claims priority under 35 U.S.C. §119 to German Patent Application No. 10 2005 032 196.8 filed Jul. 9, 2005, the entire disclosures of which are herein expressly incorporated by reference.

SUMMARY OF THE INVENTION

The invention relates to a drive system for a motor vehicle having a main drive such as an internal combustion engine, an electric drive coupled to the main drive, and a transmission.

Many different drive systems are known, for example, in the case of hybrid vehicles or electric vehicles, where the electric machine is operated as a generator during a braking operation or during the coasting operation, and energy is recuperated in this manner. Also known are the support of the shifting operations of a transmission unit by a possibly existing electric machine and the resulting improvement of the shifting or driving comfort and, as required, the shortening of the shifting times. For example, German Patent Document DE 103 35 775 A1 describes such a drive system having a transmission device, where an accelerated ratio change takes place when the tractive power is interrupted.

It is an object of the invention to improve drive systems having a transmission unit without a tractive power interruption with a view to the driving comfort during a braking operation.

By controlling an electric machine of a drive unit according to the invention, which has a transmission or drive line without tractive power interruption (or a transmission device without tractive power interruption), a desired braking torque can be kept constant also during a braking operation with a ratio change that takes place during the braking operation.

Tractive power interruption in the context of the invention means that the transmission line or the components of the transmission line are constructed such that, for a shifting operation to be implemented or for a ratio change to be implemented, no complete mechanical uncoupling (or separation) between the main drive device and the transmission output or a separation in the transmission device itself takes place. In the case of drive systems with a tractive power interruption, a tractive-power-related separation of the transmission line takes place for implementing the ratio change. The relevant literature also differentiates between manual transmissions, where the tractive power is interrupted during a shifting operation, and automatic transmissions where the tractive force is not interrupted during the shifting. Such automatic transmissions are transmission devices without tractive force interruption in the context of the invention. These are particularly: Automatic transmissions (fully automatic transmissions), CVT transmissions (continuous variable transmission or continuously adjustable transmission device), double clutch transmissions (DKG) or centrally synchronized transmissions (ZSG).

By means of the drive system according to the invention, for example, the shifting comfort of a range transmission without a tractive power interruption is considerably increased. Shock motions occurring in the case of conventional drive systems as a result of the additional (feedback) braking effect of the internal-combustion engine can be successfully avoided by means of the invention.

In a preferred embodiment of the invention, the demanded braking torque is proportionally provided by the electric machine and proportionally by the service brake in the form of a hydraulic braking system or the like—in individual cases, a braking is also conceivable solely by the generatively operated electric machine. In the case of a braking operation, during which a change of the transmission ratio takes place, the distribution of the braking torque between the electric machine and the service brake is also changed or adapted by means of the drive system according to the invention. For this purpose, the additional braking torque of the main drive device generated on the basis of the ratio change and the always existing tractive power connection between the output of the transmission device and the drive shaft of the main drive device is counteracted by controlling the electric machine and is compensated. This additional braking torque is composed of the drag torque of the internal-combustion engine and the torque resulting from the angular momentum change. Depending on the amount of the additional torque (drag torque+angular momentum change of the internal-combustion engine), the braking torque fraction (torque with the braking effect, in which case, the electric machine can be operated with a torque having the braking effect, or negative torque as well as generatively as well as motively) of the electric machine operating with the negative torque—particularly generatively—is correspondingly reduced, or, as required, the electric machine is operated with a positive torque (torque having an accelerating effect)—particularly motively, in order to actively drive the internal-combustion engine and thus compensate the drag torque or the resulting momentum from the angular momentum change of the internal-combustion engine. As required, this means that the additional braking torque, even without an existing braking torque of the electric machine would lead to an exceeding of the braking torque desired on the basis of the braking torque demand (drag torque of the internal-combustion engine>braking torque fraction of the electric machine).

In a further exemplary embodiment according to the invention, it is provided that the service brake be operated in a steady-state manner during braking operations with a ratio change; which means that no dynamic changes of the control elements are to be carried out, and the electric machine is to be controlled such that torque changes are compensated which may occur and influence the desired braking torque at the output of the transmission device or the desired overall braking torque (wheel braking torque at the axle to be braked). As a result, the advantages of the electric machine can be fully utilized with respect to its dynamics, its time response and its torque precision for a jolt-free smooth braking operation.

The exemplary control device for controlling the electric machine is advantageously constructed such that it monitors the operating readiness of the electric machine. For this purpose, it is checked whether the electric machine can be used at all in the required manner at the respective point in time. This is, for example, not so if the electric machine has a defect (report of an error message) or the charge of the energy storage device assigned to the electric machine does not permit a corresponding use of the electric machine (for example, if the electric machine is needed as a generator and the energy storage device is too full or other energy discharge devices are not available—or if the electric machine is needed as a motor and the energy storage device is empty). Particularly in the event that the electric machine is not ready to operate, the main drive device is controlled in the manner of a replacement, such that the rotational target speed at the transmission input required because of a ratio change is adjusted exclusively by the internal-combustion engine. For example, the main drive device constructed as an internal-combustion engine may be adjusted by an advance angle adjustment and/or a change of the valve strokes and/or the valve timing such that the internal-combustion engine virtually neutralizes itself in that it is driven by additional firing and thereby itself neutralizes its drag torque or torque from the angular momentum change. Advantageously, the shifting times or the ratio gradient(s) (di/dt, i=ratio) of the transmission device can be changed as a function of the operating condition for example, the temperature of the electric machine, the charging condition of the assigned energy storage device. Preferably, the adaptation of the shifting times or ratio gradients takes place automatically during the operation of the drive system.

Other objects, advantages and novel features of the present invention will become apparent from the following detailed description of the invention when considered in conjunction with the accompanying drawings.

BRIEF DESCRIPTION OF THE DRAWINGS

An embodiment of the invention is illustrated in the drawing and will be described in detail in the following.

DETAILED DESCRIPTION OF THE DRAWINGS

Figure 1:
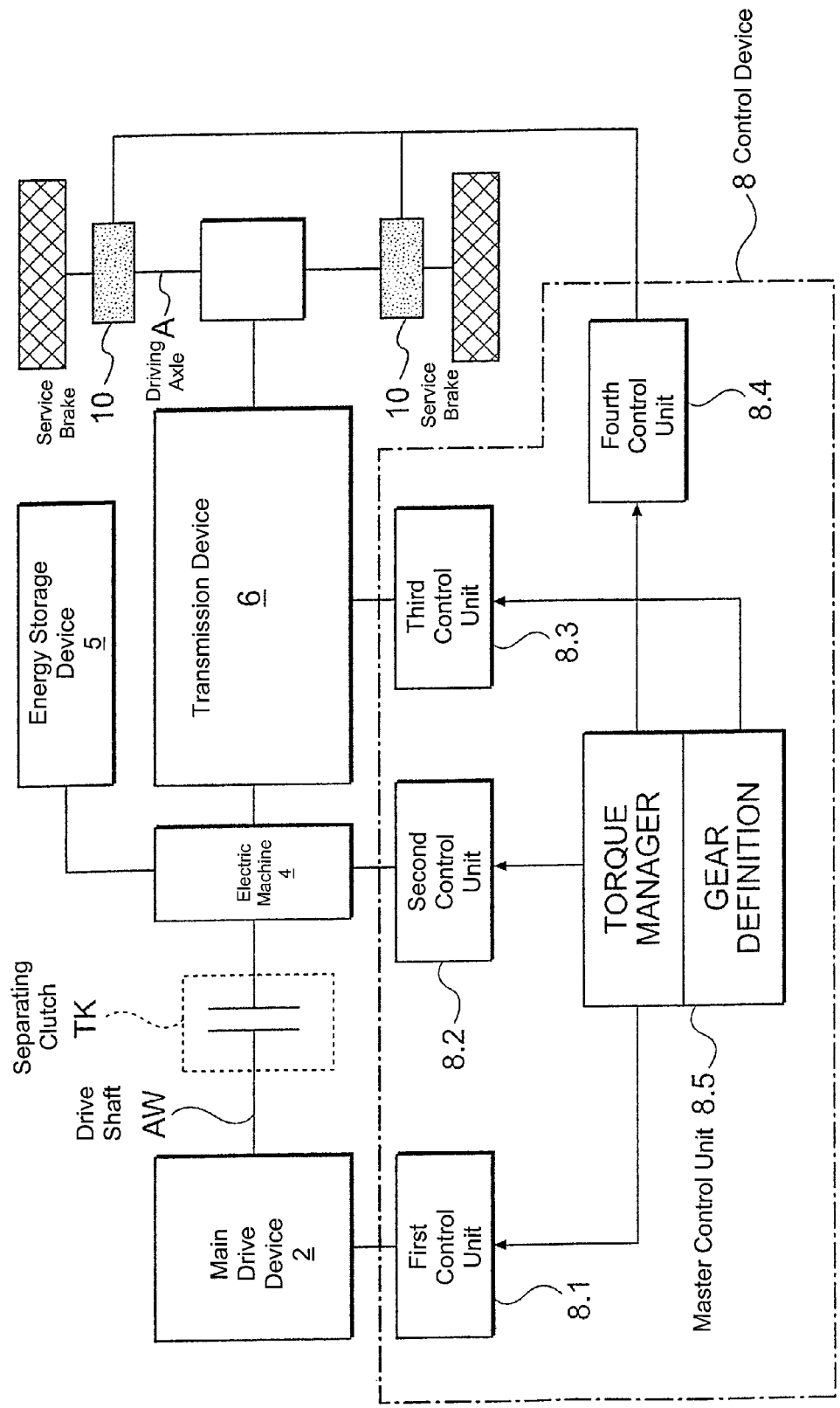
FIG. 1 is a schematic representation of a drive system according to the invention.

FIG. 1 is a schematically simplified view of a drive system according to the invention acting upon a driving axle A of a motor vehicle. The drive system according to the invention comprises a main drive device 2, preferably in the form of an internal-combustion engine, an electric machine 4 preferably connected directly (without the intermediate connection of a separating clutch) with the crankshaft of the internal-combustion engine 2, in addition to an energy storage device 5 assigned to this electric machine 4, as well as a transmission device 6 operatively connected with the drive shaft AW of the internal-combustion engine 2 and with the drive shaft of the electric machine 4, and a control device 8 controlling at least the electric machine 4 and the transmission device 6. The rotor of the electric machine 4 is preferably arranged directly on the drive shaft AW (crankshaft or its extension) of the internal-combustion engine 2, or the rotor forms a part of the drive shaft AW of the electric machine 4, so that a very space-saving construction is obtained. The components of the drive system are constructed such that the transmission line carries out any ratio change by the transmission device 6 without an interruption of the tractive power. For this purpose, a transmission device 6 is used which has no tractive power interruption, such as a corresponding automatic transmission (fully automatic transmission), a CVT transmission (continuous variable transmission or continuously adjustable transmission device), a double clutch transmission (DKG) or a centrally synchronized transmission (ZSG), as described in an embodiment in German Patent Document DE 197 41 440 A1.

For controlling the electric machine 4, the control device 8 is constructed such that, in the event of an existing braking demand (which defines a constant desired braking torque) and a change of the transmission ratio automatically implemented in the presence of this braking demand (or the implementation of the braking operation on the basis of the applied braking demand), the electric machine is controlled such that the braking torque at the transmission output, which changes because of the ratio change, or the thereby changing total braking torque is at least partially compensated, so that an essentially constant total braking torque in the amount of the braking torque demand is maintained. Here, the demanded total braking torque is provided at least proportionally by the electric machine 4. This means that, at least at the start of the braking operation, the desired braking torque demanded as a result of the braking demand is provided either completely by the electric machine 4 operated with a negative torque or partly by a service brake 10 and partly by the electric machine 4 operated with a negative torque at this point in time. In the further course of the braking operation, the total braking torque would change to an extent noticeable by the driver without corresponding countermeasures according to the invention because of an occurring ratio change since, as a result of the changed ratio (greater ratio/low gear), the internal-combustion engine 2 acts as an additional braking load that has to be dragged along. In order to counteract the above, the electric machine 4 is controlled such that the braking torque of the electric machine 4 is reduced by as much as the internal-combustion engine 2 to be dragged along increases the torque. If the ratio change is so large that, as a result of the additional braking torque of the internal-combustion engine 2 that has to be pulled along, that the total braking torque is greater than the demanded desired braking torque even when the electric machine 4 is not active (electric machine 4 generates no (negative) braking torque), the electric machine 4 will be driven with a positive torque. The electric machine 4 thereby generates a positive torque which acts upon the drive shaft AW for the purpose of accelerating the internal-combustion engine 2 and counteracts the excessively braking drag torque of the internal-combustion engine 2 and finally neutralizes that drag torque. A jolt occurring in the case of conventional transmission lines as a result of an automatic downshifting during a braking operation is thereby effectively prevented.

The control device 8 preferably comprises first control units 8.1 for controlling the main drive device 2, second control units 8.2 for controlling the electric machine 4, third control units 8.3 for controlling the transmission device 6, fourth control units 8.4 for controlling the service brake 10 as well as a master control unit 8.5 for coordinating the individual control units 8.1, 8.2, 8.3, 8.4. Furthermore, additional control units may be present for carrying out other control tasks. It is, for example, conceivable that a separating clutch TK is arranged between the electric machine 4 and the main drive device 2 and/or between the electric machine 4 and the transmission device 6, the separating clutch TK not being used for the separation of the transmission line during ratio changes but, for example, as a starter during a starting operation of the main drive device 2 constructed as an internal-combustion engine 2 and being controlled according to corresponding criteria.

The method of operation of the drive system according to the invention will be described in detail in the following by using the signal forms illustrated in FIG. 2 and FIG. 3 over the time on the example of a drive system having an automatic range transmission.

Figure 2:
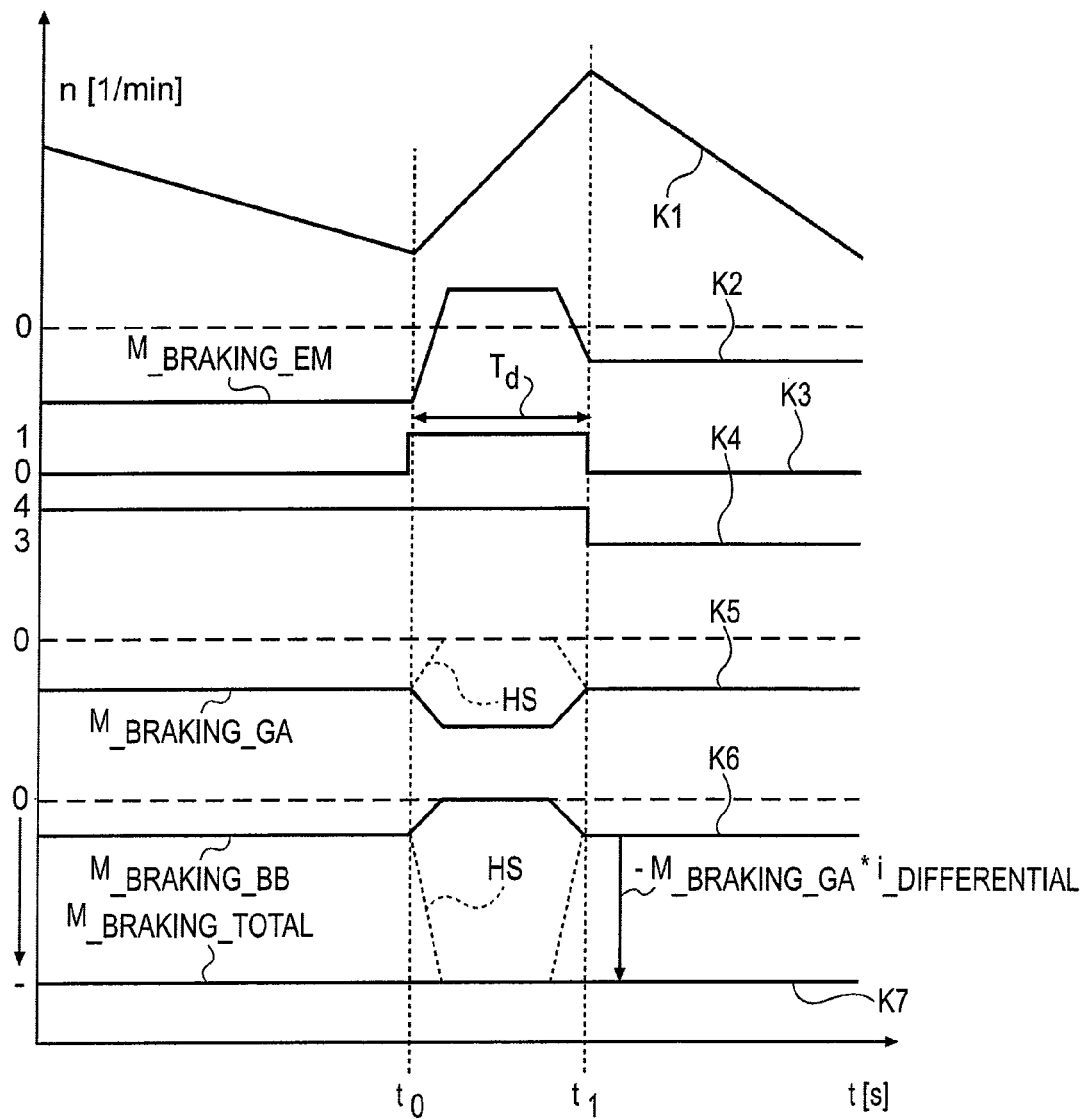
FIG. 2 is a schematic view of different signal forms of torques and other signals for a braking operation with a change of the transmission ratio in the case of a drive system according to the invention constructed as an automatic range transmission.

FIG. 2 shows the following seven different signal forms in curves K1-K7:

the first curve K1 from above—the course of the rotational engine speed n of the main drive device 2 over the time t, the second curve K2 from above—the course of the braking torque $M\_braking\_EM$ generated by the electric machine 4 over the time t, the third curve K3 from above—the duration of the shifting operation over the time t, the fourth curve K4 from above—the gear signal shown over the time t, the fifth curve K5—the course of the braking torque $M\_braking\_GA$ at the transmission output over the time t, the sixth curve K6 from above—the course of the braking torque $M\_braking\_BB$ generated by the service brake 10 over the time t, and the seventh curve K7 from above—the course of the resulting total braking torque $M\_braking\_total$ over the time t.

The torque course of the braking torque at the output of the transmission device 6 (K5) illustrated in the curves K5 and K8 by a broken line and marked HS and the pertaining torque course of the braking torque of the service brake 10 (K6) illustrate the torque courses during a shifting operation per manual shift (thus, with an interruption of the tractive power).

In the case of a drive system having an automatic range transmission, the rotational speed n of the main drive device 2 will extend approximately according to curve K1 during a braking operation with a constant braking torque demand. The rotational speed of the internal-combustion engine 2 will first decrease in the actual gear position until, at the point in time $t_0$, there is a reaching or falling-below a defined rotational speed limit $n\_limit$ for the actual transmission ratio. Starting at the point in time $t_0$, within a defined shifting duration $T_d$, a ratio change or a shifting operation is automatically carried out (FIG. 2: Curve K3 or FIG. 3: First curve K8 from above), in which case, during the shifting period $T_d$, the ratio i for a backshift operation is correspondingly increased. During the shifting period $T_d$, the rotational speed of the internal-combustion engine 2 simultaneously rises again (the internal-combustion engine 2 is dragged along or accelerated). The curve K4 shows the downshifting from the fourth into the third gear position, at the point in time t1, the shifting operation being concluded and the lower gear position being engaged. Starting with the shifting operation at the point in time $t_0$, the braking torque increases at the transmission output because, as a result of the lower gear position (against the drag torque) of the internal-combustion engine 2) a higher rotational speed has to be forced at the transmission input. For increasing the rotational speed at the transmission output, from the start, a braking drag torque of the internal-combustion engine 2 and the torque resulting from the change of the angular momentum therefore have to be overcome because of the non-existing tractive interruption. This torque, that is to be overcome, acts upon the transmission output as an additional braking torque of the transmission line. Countermeasures are taken according to the invention, however, in order to not change the braking torque desired at the transmission output and therefore the desired total braking torque to be adjusted at the wheel or to keep it constant within the scope of the present constant braking demand. These countermeasures take place in that at least the electric machine 4 is controlled such that the total braking torque changing on the basis of the ratio change or the braking torque occurring at the transmission output is at least partially compensated, so that an essentially constant total braking torque $M\_braking\_total$ is maintained. In the illustrated embodiment, the countermeasures against the additional braking torque of the internal-combustion engine to be dragged take place with the start of the shifting operation at the point in time to in that the braking torque $M\_braking\_EM$ of the electric machine 4—operated at this point in time with a negative torque—, which exists before the start of the shifting operation, is reduced. Should this reduction of the amount of the braking torque, as in the diagrams of FIG. 2, not be sufficient for compensating the additional braking torque of the internal-combustion engine to be dragged, or for reducing this fraction, the service brake 10 is controlled such that the additional braking torque is completely compensated and the desired constant total braking torque is maintained in a constant manner. This operation is illustrated by curves K2, K5 and K6. According to curve 2, countermeasures are taking against the additional braking torque (drag torque of the internal-combustion engine 2) by reducing the braking torque provided by use of the electric machine 4 and, since this is obviously not sufficient, the electric machine 4 is operated with a positive torque for driving the internal-combustion engine 2 to be dragged. According to the present embodiment, countermeasures are taken against the additional braking torque of the internal-combustion engine 2, in addition to the controlling of the electric machine 4, by the controlling of the service brake 10 in that the braking torque of the service brake 10 is also reduced (see curve K6). However, this is not absolutely necessary. According to the invention, it is only preferable that, at least by controlling the electric machine 4, the additional braking torque (drag torque) of the internal-combustion engine 2 to be dragged, which occurs as a result of the ratio change, is compensated such that a constant total braking torque according to the braking demand (see curve K7) can be adjusted. For determining the total braking torque, additional ratio factors should always be taken into account here, such as the transmission ratio of the differential gearing situated between the transmission output and the wheel to be braked.

Figure 3:
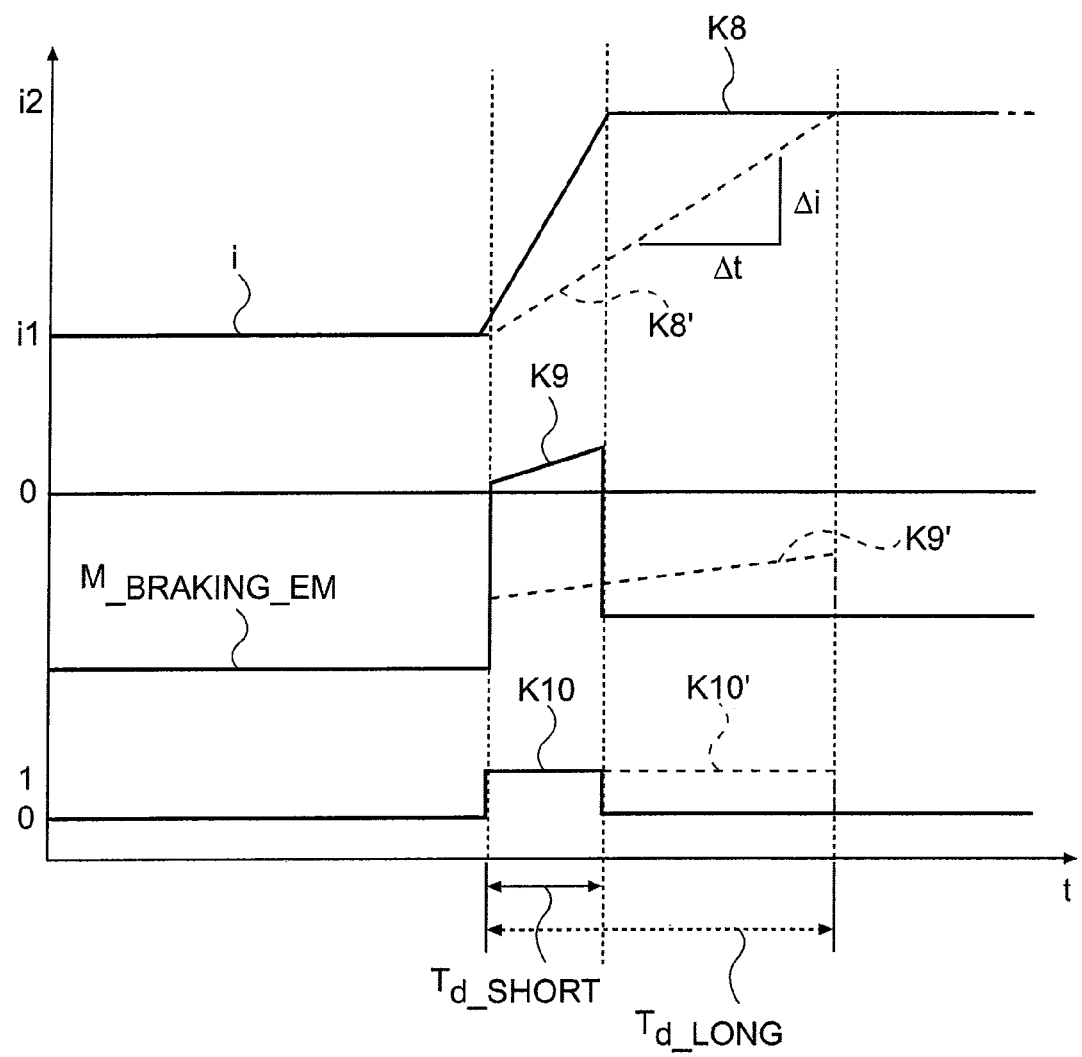
FIG. 3 is a schematic view of the signal forms of the ratio change, the braking torque of the electric machine and the gear signal in the case of a drive system with automatic range transmission according to the invention.

As an example, FIG. 3 shows the change of the ratio I within a defined shifting period or shifting duration $T_d$ and the resulting or thereby demanded change at the braking torque of the electric machine 4 (by use of its targeted control). Here, the solid curves K8, K9 and K10 show the signal form with a short shifting time $T_{d\_short}$, and the broken curves K8', K9' and K10' show the signal form in the case of a shifting time $T_{d\_long}$ prolonged in comparison to the first shifting time $T_{d\_short}$.

The two upper curves K8 and K8' illustrate the ratio change during different shifting times over the time t;

the two center curves K9 and K9' illustrate the course of the torque of the braking torque to be generated by the electric machine 4 over the time according to FIG. 2, Curve K2; and the two lower curves K10 and K10' illustrate the duration of the shifting operating according to FIG. 2, Curve K3.

FIG. 3 clearly illustrates that, in contrast to the operation with shorter shifting times $T_{d\_short}$, in the case of shifting times $T_{d\_long}$ which are longer in comparison, the electric machine 4 is operated with a clearly smaller change of the braking torque in order to compensate the additional braking torque (drag torque) of the internal-combustion engine 2.

A braking torque of the electric machine 4 in the context of the invention includes all drive torques generated by the electric machine 4 during a braking operation, whether they have a negative preceding sign (braking effect) or a positive preceding sign (acceleration effect).

In a particularly preferred embodiment of the invention, the transmission device 6 is constructed as an automatic range transmission with variable shifting times, the shifting times being variable as a function of the operating condition of the electric machine 4 or of a higher-ranking strategy. A higher-ranging strategy in the context of the invention is, for example, a strategy with a differentiation between a sporty mode (with shortened, preferably fixedly defined shifting times) and a non-sporty mode (with shifting times that are prolonged in comparison to the sporty mode and are preferably fixedly defined). In this case the operating condition of the electric machine 4 is defined particularly as a function of the temperature of the electric machine and/or the charge condition of the energy storage device 5 assigned to the electric machine 4.

The invention is preferably used in the case of vehicles with a hybrid drive (such as a combined drive of an electric machine and/or an internal-combustion engine) and/or vehicle with a so-called active transmission. Special advantages accompanying the implementation of the invention are the increase of the braking comfort in the case of hybrid drives (with at least one electric machine as part of the transmission line) with a range transmission, an improved yield of braking energy in the recuperation operation and the reduction of wear in the clutches of the transmission device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive system for a motor vehicle, comprising:
   a main drive device that is a combustion engine;
   an electric machine coupled to the main drive device;
   a transmission device for implementing a ratio change without a tractive power interruption; and
   a control device for controlling the electric machine and for controlling the transmission device, wherein:
   the control device, in the event of a braking demand, causes a demanded total braking torque to be at least proportionally provided by the electric machine,
   if a change of the transmission ratio is implemented in the presence of an existing braking demand for a constant total braking torque, the control device controls the electric machine to at least partially compensate for changing of the total braking torque due to an additional braking torque caused by the ratio change, to maintain the constant total braking torque according to the braking demand, and
   the additional braking torque comprises a drag torque of the combustion engine and a torque resulting from an angular momentum change of the combustion engine.

2. Drive system according to claim 1,
   wherein the control device is constructed such that the demanded overall braking torque is provided proportionally by the electric machine and proportionally by a service brake.

3. Drive system according to claim 2,
   wherein the control device is constructed such that the service brake is uniformly operated, while torque changes influencing the total braking torque are compensated as a result of controlling the electric machine.

4. Drive system according to claim 1,
   wherein the control device monitors an operating readiness of the electric machine.

5. Drive system according to claim 4,
   wherein the control device, in the event that the electric machine is not ready to operate, controls the main drive such that a target rotational speed for the new transmission ratio at the transmission input required because of the implemented ratio change is adjusted solely by the internal-combustion engine.

6. Drive system according to claim 1,
   wherein the transmission device is an automatic range transmission with variable shifting times, having shifting times changeable as a function of an operating condition of the electric machine.

7. Drive system according to claim 1,
   wherein the transmission device is an automatic range transmission with variable shifting times, the shifting times for individual gear changes being defined by a higher-ranking strategy with a corresponding control of the electric machine.

8. The drive system according to claim 1, wherein the main drive device comprises an internal-combustion engine.

9. A hybrid vehicle, comprising:
   a main drive device that is a combustion engine;
   an electric machine coupleable to the main drive device;
   a transmission for providing a variable drive ratio to a drive shaft without tractive power interruption; and
   a control unit of the vehicle adapted to control the electric machine and the transmission to obtain a total braking torque provided at least proportionally by the electric machine, and adapted to control the electric machine, during application of the total braking torque, to at least partially compensate for braking torque changes due to an additional braking torque caused by shifting transmission ratios to obtain a substantially constant total braking torque,
   wherein the additional braking torque comprises a drag torque of the combustion engine and a torque resulting from an angular momentum change of the combustion engine.

10. The hybrid vehicle according to claim 9, wherein the control unit further controls the main drive device and the service brake.

11. The hybrid vehicle according to claim 10, wherein the control unit obtains a total braking torque provided proportionally by the electric machine and proportionally by the service brake.

12. The hybrid vehicle according to claim 10, wherein the control unit operates the service brake substantially uniformly and compensates for the braking torque changes by controlling the electric machine.

13. The hybrid vehicle according to claim 9, wherein, when the electric machine is not ready to operate, the control unit controls the main drive to obtain a target rotational speed for a newly selected transmission ratio.

14. The hybrid vehicle according to claim 9, wherein the transmission comprises one of a automatic range transmission, a continuous variable transmission, a double clutch transmission and a centrally synchronized transmission.

15. A method of controlling a hybrid drive with an electric machine and a main drive that is a combustion engine, the method comprising the acts of:
   controlling with a control unit the electric machine to obtain a demanded total braking torque at least proportionally from the electric machine;
   controlling with the control unit a transmission to change a transmission ratio thereof without a tractive power interruption; and
   controlling the electric machine to obtain a substantially constant total braking torque by at least partially compensating for braking torque changes due to an additional braking torque caused by changing transmission ratios, wherein the additional braking torque comprises a drag torque of the combustion engine and a torque resulting from an angular momentum change of the combustion engine.

16. The method according to claim 15, further comprising controlling with the control unit a service brake to obtain the demanded total braking torque at least proportionally therefrom.

17. The method according to claim 15, further comprising operating the service brake substantially uniformly and compensating for the braking torque changes by controlling the electric machine.

18. The method according to claim 15, further comprising controlling the main drive with the control unit to obtain a target rotational speed for a newly selected transmission ratio when the electric machine is not ready to operate.

19. A drive system for a motor vehicle, comprising:
a main drive device that is a combustion engine;
a service brake;
an electric machine coupled to the main drive device;
a transmission device for implementing a ratio change without a tractive power interruption; and
a control device for controlling the electric machine, the transmission device, and the service brake, wherein:
the control device, in the event of a braking demand, causes a demanded total braking torque to be provided by the electric machine and the service brake,
if the transmission ratio is increased in the presence of an existing braking demand for a constant total braking torque, the control device controls the electric machine and the service brake to at least partially compensate for changing of the total braking torque due to an additional braking torque caused by the ratio change, to maintain the constant total braking torque according to the braking demand,
the additional braking torque comprises a drag torque of the combustion engine and a torque resulting from an angular momentum change of the combustion engine,
the control device controls the electric machine to reduce the braking torque provided by the electric machine, and
the control device controls the service brake to reduce the braking torque provided by the service brake.

* * * * *